United States Patent
Mohl et al.

(10) Patent No.: US 8,429,125 B2
(45) Date of Patent: Apr. 23, 2013

(54) CONVERSION OF PHYSICAL COMPUTERS TO VIRTUALIZED ENVIRONMENTS METHOD AND SYSTEM

(75) Inventors: Steven Eugene Mohl, Sanford, FL (US); Lokesha B. Krishnamurthy, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 21 days.

(21) Appl. No.: 13/247,816

(22) Filed: Sep. 28, 2011

(65) Prior Publication Data

US 2013/0080387 A1    Mar. 28, 2013

(51) Int. Cl.
*G06F 17/00* (2006.01)
(52) U.S. Cl.
USPC .............................. 707/624; 707/640; 711/162
(58) Field of Classification Search .................. 707/624, 707/640; 711/162
See application file for complete search history.

(56) References Cited

U.S. PATENT DOCUMENTS

| 8,117,410 B2 * | 2/2012 | Lu et al. ........................ 711/162 |
| 2010/0076934 A1 * | 3/2010 | Pershin et al. ................ 707/640 |

* cited by examiner

*Primary Examiner* — Belix M Ortiz Ditren
(74) *Attorney, Agent, or Firm* — Wilmer Cutler Pickering Hale and Dorr LLP

(57) ABSTRACT

A method for converting a physical file system to a virtual file system of a virtual machine. The method includes initiating a new incremental physical to virtual conversion process, and analyzing a history of a plurality of prior incremental conversions to determine whether there exists at least one prior incremental conversion that failed. Upon determination that a prior failed incremental conversion occurred, the method further includes determining a correct chronological order of the plurality of prior incremental conversions, and determining an original failure point and any subsequent failure points. The prior incremental conversions are re-applied from each of said original failure point and said subsequent failure points in the correct chronological order with the most recent incremental conversion re-applied last.

20 Claims, 11 Drawing Sheets

CONVERSION OF PHYSICAL COMPUTERS TO VIRTUALIZED ENVIRONMENTS METHOD AND SYSTEM

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Continuous replication technology often includes RAID based replication schemes (e.g., disk mirroring, parity, or the like). Continuous replication maintains copies of the data as the data is being written to by applications. Periodic replication is another technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. For both continuous replication and periodic replication, in addition to disaster recovery, the replicated data enables a number of other uses, such as, for example, data mining, reporting, testing, and the like. In this manner, the replicated data copy ensures data integrity and availability. Additionally, replication technology is frequently coupled with other high-availability techniques, such as clustering, to provide an extremely robust data storage solution.

Data storage required for applications such as file systems and databases are typically allocated from one or more storage devices that are maintained as a "volume." The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

In very large distributed computer systems the data is distributed across a number of data servers. The clients directly write data to the data servers with minimal points of interaction with any metadata server. The data servers typically have multiple LUNs (logical unit numbers) which have their own reserved storage space. Each LUN can have a large number of partitions, with the objects contained in these partitions. The files of distributed computer system file system are composed of the objects from any of the data server LUN partitions. The objects from various data servers are combined to form RAID groups.

In a conventional virtual environment, it is desirable to have the ability to convert a physical server to a virtual machine in a target virtual environment such as VMware or Microsoft Hyper-V. Generally this concept is known as a "Physical to Virtual", or P2V, conversion. In addition to direct conversion of a full image of a physical server to a virtual machine, the ability to apply incremental/differential changes to the virtual machine will also be supported. This will save time and computing resources by not having to repeatedly convert full system images. A product which provides traditional P2V capability while additionally supporting the application of incremental backup data to a target virtual machine has inherent risk of causing operator manual intervention if there is a failure in the incremental conversion process.

The above affect is, in part, due to potential higher instances of environmental failures associated with moving data to a virtual environment and the more complex makeup of virtual environment configurations, in general. If this occurs during unattended (schedule/policy-based) processing, a target virtual machine can fall drastically out of sync with the source server until the failure condition is rectified. Before a user can continue to apply new incremental change data to a fully converted virtual machine image they would normally have to apply missing incremental changes to the target virtual machine or start over again with a full conversion. In today's highly scaled up environments re-running a full conversion can be very time consuming for any traditional data center.

Additionally, applying the incremental/differential changes to the target virtual machine would require manual intervention on the operator's part. It would be time consuming and the user would risk mistakes in the application of the incremental/differential data, potentially, while risking corruption to the virtual machine. If this occurs the operator would experience even greater recovery time due to having to perform an original conversion of the full physical server.

SUMMARY OF THE INVENTION

Embodiments of the present invention provide a solution that enables an efficient, highly available, and highly scalable process for the replication of data for a distributed computer system including one or more virtual machines. Embodiments of the present invention implement an optimized scheme that can look into individual VHD (virtual hard disk) files thru the file systems they host to truly eliminate copying white spaces.

In one embodiment, the present invention is implemented as a method for converting a physical file system to a virtual file system of a virtual machine. The method includes initiating a new incremental physical to virtual conversion process, and analyzing a history of a plurality of prior incremental conversions to determine whether there exists at least one prior incremental conversion that failed. Upon determination that a prior failed incremental conversion occurred, the method further includes determining a correct chronological order of the plurality of prior incremental conversions, and determining an original failure point and any subsequent failure points. The prior incremental conversions are re-applied from each of said original failure point and said subsequent failure points in the correct chronological order with the most recent incremental conversion re-applied last.

In one embodiment, the physical file system is a physical volume and the virtual file system is a virtual volume.

In one embodiment, the physical file system comprises a physical LUN and the virtual file system comprises a virtual LUN.

In one embodiment, the physical file system comprises a physical hard drive and the virtual file system comprises a virtual hard drive.

In one embodiment, the converting of the physical file system to the virtual file system comprises a self-healing process that is free of operator interaction.

In one embodiment, the virtual machine is processed by applying a set of incremental conversions in reverse chronological order to the virtual file system.

In one embodiment, the plurality of incremental conversions comprises a plurality of snapshots.

In one embodiment, the present invention is implemented as a computer readable storage medium having stored thereon, computer executable instructions that, if executed by a computer system cause the computer system to perform a conversion method. The method includes initiating a new incremental physical to virtual conversion process, and analyzing a history of a plurality of prior incremental conversions to determine whether there exists at least one prior incremental conversion that failed. Upon determination that a prior failed incremental conversion occurred, the method further includes determining a correct chronological order of the plurality of prior incremental conversions, and determining an original failure point and any subsequent failure points. The prior incremental conversions are re-applied from each of said original failure point and said subsequent failure points in the correct chronological order with the most recent incremental conversion re-applied last.

In one embodiment, the present invention is implemented as a volume conversion system. The volume conversion system includes a computer system having a processor coupled to a computer readable storage media and executing computer readable code which causes the computer system to implement a conversion manager module. The conversion module initiates a new incremental physical to virtual conversion process; analyzes a history of a plurality of prior incremental conversions to determine whether there exists at least one prior incremental conversion that failed; upon determination that a prior failed incremental conversion occurred, determines a correct chronological order of the plurality of prior incremental conversions; determines the original failure point and all subsequent failure points and re-applying the data from each of those in the correct chronological ordering with the most recent last.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Figure 1:
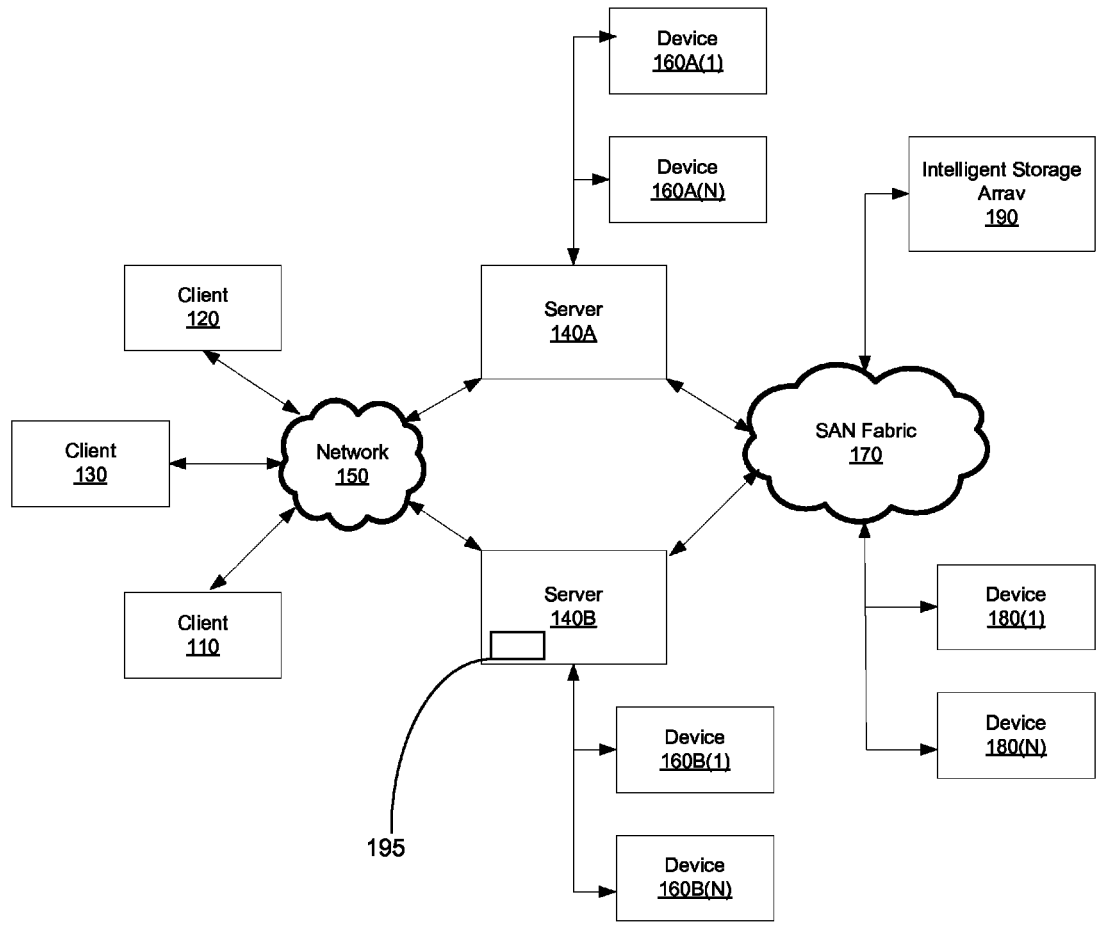
FIG. 1 is a block diagram depicting a network architecture according to one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention are directed towards solving the following problem. How-to reliably and efficiently create a new copy, mirror or clone of a fully synchronized data volume used in a virtualized environment (e.g., Hyper-V, VMWare, etc.) from a similarly provisioned physical data volume.

Embodiments of the present invention provide a solution that enables an efficient and highly scalable process for the replication of data for a distributed computer system including one or more virtual machines. Embodiments of the present invention can replicate a data volume optimally. The volume may have one or more virtual file systems belonging to one or more virtual machines. Embodiments of the present invention are optimized to function with highly scalable distributed computer systems having hundreds of virtual nodes and physical nodes, or more (e.g., cloud computing system, etc.). In a typical usage scenario, application data resides across a large number of data server nodes. These data server nodes can be physical nodes, virtual nodes, or a combination of the two. Clients interact with the distributed computer system by directly writing data to one or more of the virtual/physical data server nodes. The physical nodes (e.g., data servers) typically have multiple LUNs (logical unit numbers) which each have their own reserved storage space. A typical implementation would have the LUNs configured with multiple partitions.

The files of the distributed computer system are composed of objects (e.g., data objects, etc.) which can be from any of the data server nodes, any of the LUNs and/or any of the partitions. Embodiments of the present invention efficiently handle conversion and replication for the virtual nodes of the distributed computer system in a manner that is scalable and provides high availability. A typical computer system environment is now described in the discussions of FIG. 1 below.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a conversion manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.). A typical replication process is now described in the discussions of FIG. 2 below.

Figure 2:
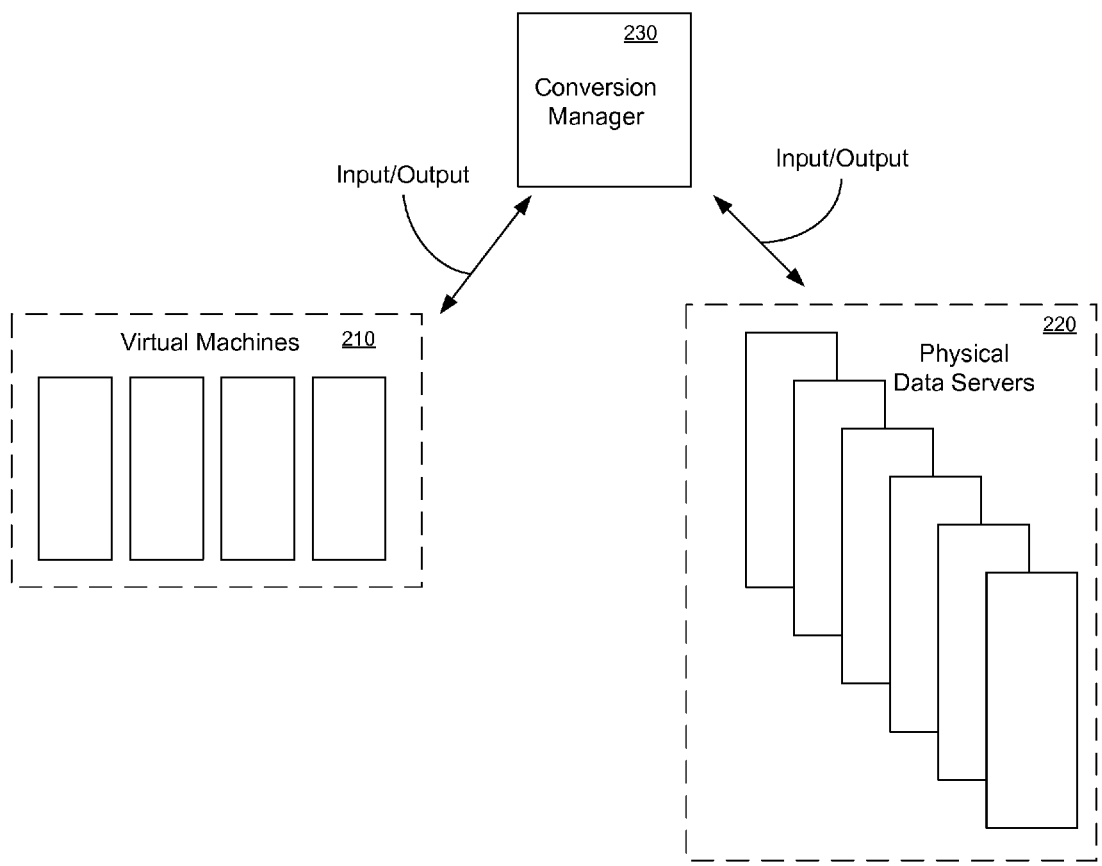
FIG. 2 shows a data flow diagram depicting the operation of an exemplary conversion process in accordance with one embodiment of the present invention.

FIG. 2 shows a data flow diagram 200 depicting the operation of an exemplary conversion process in accordance with one embodiment of the present invention. As depicted in FIG. 2, a group of virtual machine data servers 210 host data that is accessed by a large number of client computer systems (e.g., clients 110-130). The conversion manager 230 provides functionality whereby physical volumes on physical data servers (e.g., file systems, etc.) can be converted into virtual volumes on corresponding virtual machines.

In one embodiment, as I/O data comes in from the client computer systems (e.g., I/O writes), the I/O data is forwarded to a replication manager 230, which processes the I/O data and transfers it to a plurality of physical data servers 220. This data is used to keep the physical volumes on the physical servers in sync with the virtual volumes on the virtual machines. In another embodiment, as I/O data comes in from the physical data servers 220 (e.g., I/O writes), the I/O data is forwarded to a replication manager 230, which processes the I/O data and transfers it to the plurality virtual machines 210. This data is used to keep the physical volumes on the physical servers in sync with the virtual volumes on the virtual machines.

The FIG. 2 embodiment illustrates a scalable distributed computer system environment. In one embodiment, the distributed computer system environment implements any of a number of different RAID redundancy schemes by forwarding data from the replication manager 230 to the plurality of physical data servers 220.

Figure 3:
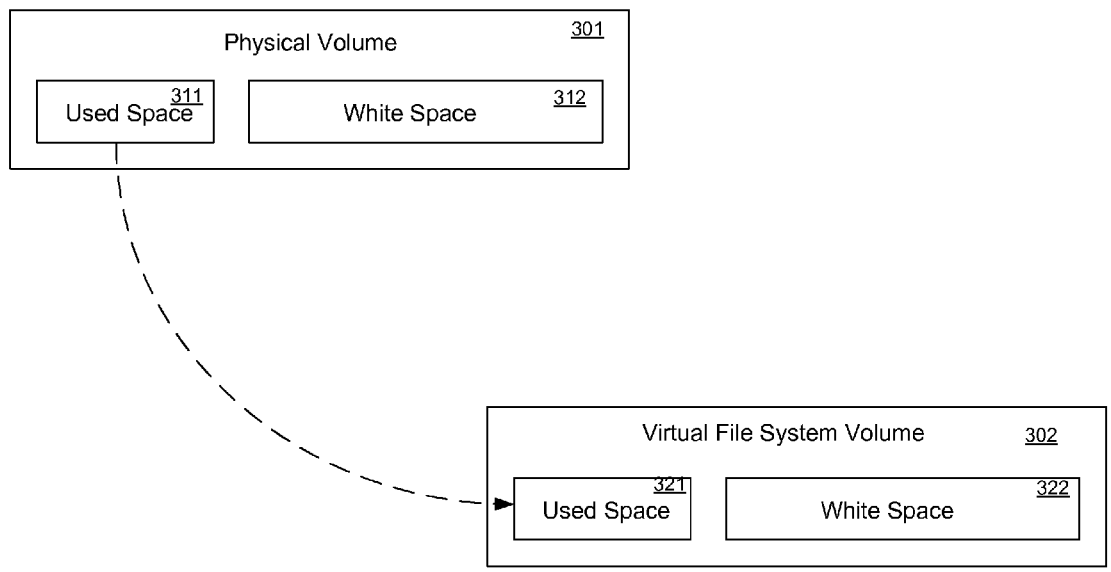
FIG. 3 shows an exemplary physical file system volume and virtual file system volume in accordance with one embodiment of the present invention.

FIG. 3 shows an exemplary physical file system volume 301 and virtual file system volume 302 in accordance with one embodiment of the present invention. As depicted in FIG. 3, the file system volume comprises both a certain amount of used space 311 and a remaining amount of unused space, which is depicted as whitespace 312. Thus, for example, in a virtual environment such as Hyper-V, where fixed VHD is used, with for example, a 24 GB fixed capacity, as compared to dynamic VHD, a file system volume may only use a sub portion (e.g., used space 311) of the total number of blocks comprising the 24 GB fixed VHD.

Embodiments of the present invention implement a physical volume to virtual file system volume conversion process. During this process, the data comprising the physical volume is transferred to a virtual file system volume. Typically, the entire allocated physical volume is not occupied with valid data. This is shown in FIG. 3 is the used space 311 versus the invalid whitespace 312. In one embodiment, the only data that is actually transferred is the used space 321 which corresponds to the used space 311 in the physical volume. The whitespace 322 is basically invalid data (e.g., don't care).

Figure 4:
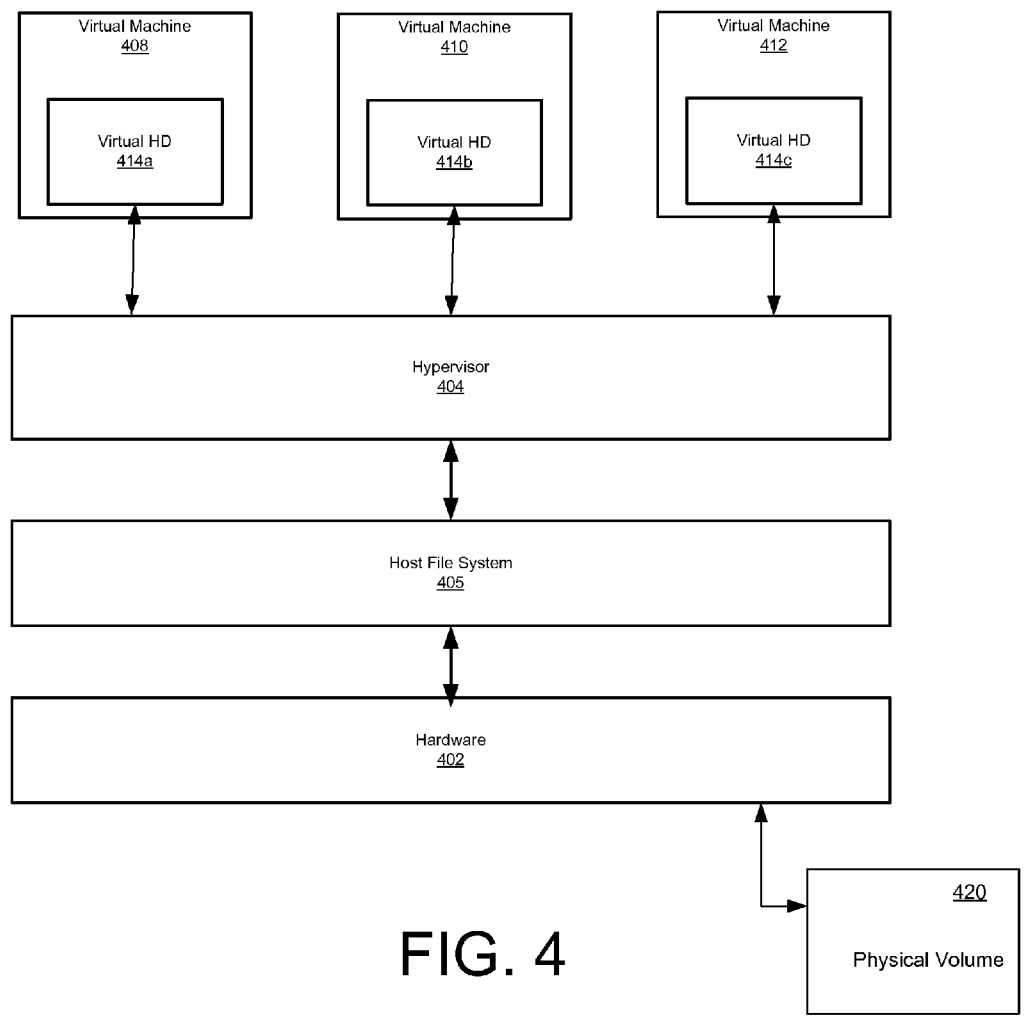
FIG. 4 shows a block diagram of an exemplary virtual environment, in accordance with one embodiment of the present invention.

FIG. 4 shows a block diagram of an exemplary virtual environment, in accordance with one embodiment of the present invention. Exemplary virtual environment 400 includes a host file system 405, hypervisor 404, and virtual machines 408-412. Components of exemplary virtual environment 400 typically execute on or otherwise be part of a distributed computing system (e.g., servers 140*a* and 140*b* of FIG. 1).

Hypervisor 404 interfaces with hardware 402 (e.g., of servers 140*a-b*) and provides resources and services to virtual machines 408-412. In one embodiment, hypervisor 404 is part of a trusted computing base (TCB). Hypervisor 404 provides abstractions including emulated devices of resources in hardware 402 to virtual machines 408-412. In this manner, the virtual hard drives 414*a-c* are emulated via the hypervisor 404 and the host file system 405 by using a physical volume 420. The physical volume 420 can be, for example, one or more LUNs on server 140A or 140B, or one of storage devices 160A(1)-(N), 160B(1)-(N), 180(1)-(N) or storage array 190. During the conversion process, data from the physical volumes is transferred to physical volume 420 which in turn instantiates the virtual file systems (e.g., virtual hard drives 414*a-c*).

Figure 5:
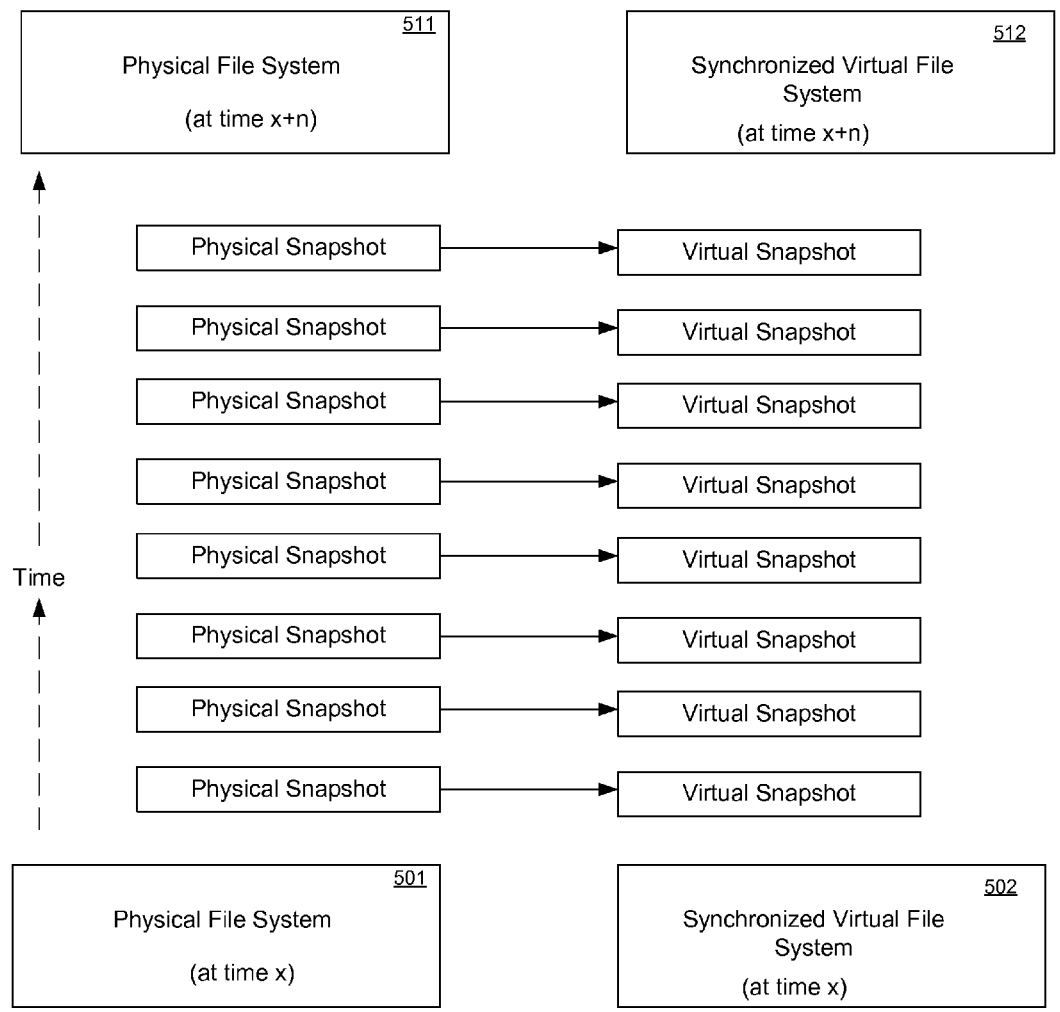
FIG. 5 shows a diagram depicting an incremental change synchronization process in accordance with one embodiment of the present invention.

FIG. 5 shows a diagram depicting an incremental change synchronization process in accordance with one embodiment of the present invention. As depicted in FIG. 5, on the bottom of shown a physical file system 501 and its corresponding synchronizer virtual file system 502, both at an initial time "X."

Embodiments of the present invention provide the ability to convert a physical server to a virtual machine in a target virtual environment (e.g., such as VMware or Microsoft Hyper-V). Additionally, embodiments of the present invention are able to apply incremental/differential changes to the virtual machine (e.g., via snapshots or other incremental change tracking mechanisms). This is shown in FIG. 5 as the physical snapshots as they go forward in time being applied to the virtual snapshots, which consequently at time "X+n" means that the physical file system 511 is fully synchronized with the virtual file system 512.

Accordingly, embodiments of the present invention save time and computing resources by not having to repeatedly convert full system images. Additionally, embodiments of the present invention do not require operator manual intervention on an occasion where there is a failure in the incremental conversion process.

In one embodiment, the new physical to virtual conversion feature of the conversion manager as two defined sub-features. The first is traditional physical to virtual as described above. The second is having the ability to create or update a target virtual machine directly from a backup image. This second concept is known as Backup to Virtual, or B2V. Given the scenario where a P2V has failed while attempting to apply incremental changes, before incremental conversions can resume, all previous incremental changes, to date, would have to have been applied to the virtual machine image. The solution to this problem so that operators do not have to manually intervene involves a few steps to "self-heal" the target virtual machine before the next run of the incremental conversion job.

Figure 6:
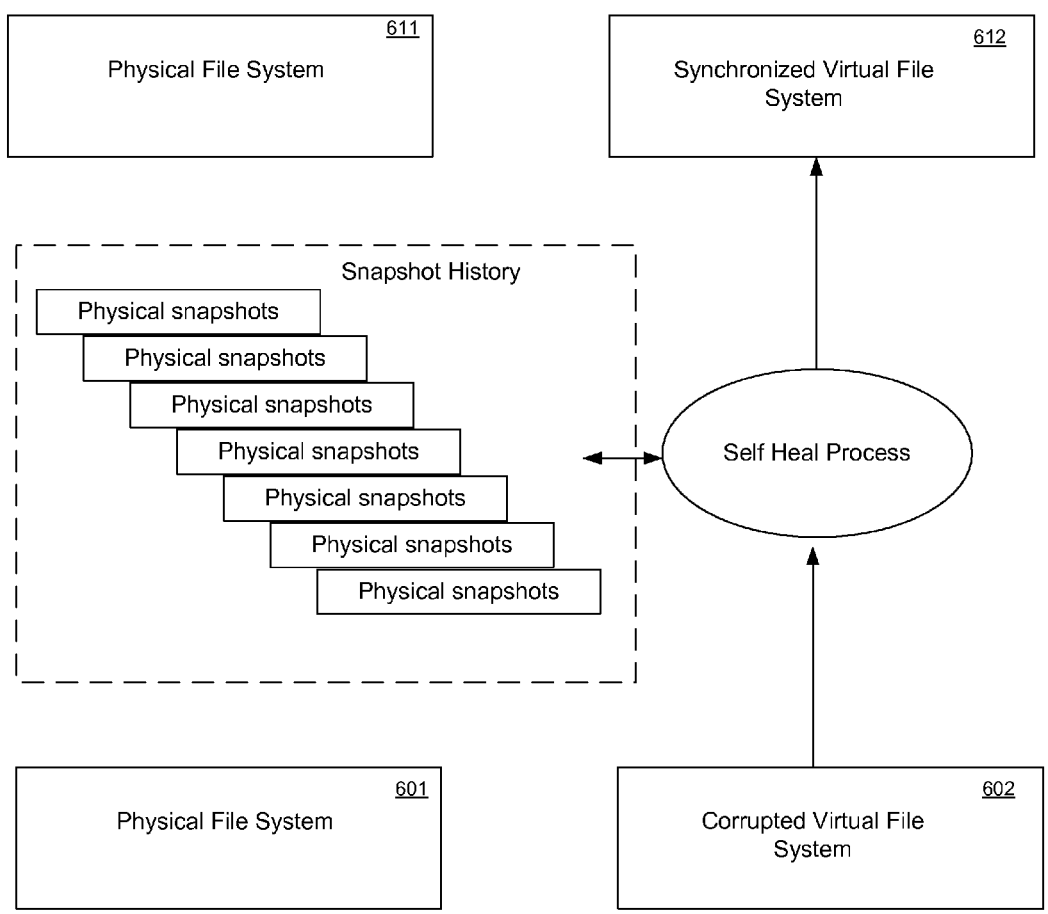
FIG. 6 shows a diagram depicting a self-healing process in accordance with one embodiment of the present invention.

FIG. 6 shows a diagram depicting a self-healing process in accordance with one embodiment of the present invention. In one embodiment, the first step requires that new incremental conversion jobs must analyze previous related job history (e.g., snapshot history) and understand if any previous incremental/differential conversion jobs have failed. Second, if failures are determined, a correct chronological ordering list of the previously failed jobs must be established. This order should be a reverse chronological ordering so that the most recently failed job is processed last (e.g., determining the original failure point and all subsequent failure points and re-applying the data from each of those in the correct chronological ordering with the most recent last). Third, for each failed job in the list an appropriate (e.g., B2V or other data source) job must be automatically created and run which will apply the incremental changes to the target virtual machine. Fourth, for each successful automatic "self-heal" job (e.g., self heal process), the original failing job from which it was derived must be marked as successful so that it is not re-applied later. Fifth, once all previously failed incremental conversions have been applied to the virtual machine image (e.g., synchronized virtual file system 612), normal P2V processing can resume.

It should be noted that as a last point, this process must be somewhat recursive in order to catch and process failures during application of automatic self-healing jobs. Accordingly, embodiments of the present invention advantageously employ automatic determination, chronological ordering, insertion of job(s) and appropriate error handling to apply incremental change data to a virtual machine. The data will come from a data source that contains previous incremental data that has not already been applied to the virtual machine image. The result is an updated virtual machine image, less interrupted operations along with reduced operator error and recovery time.

Figure 7:
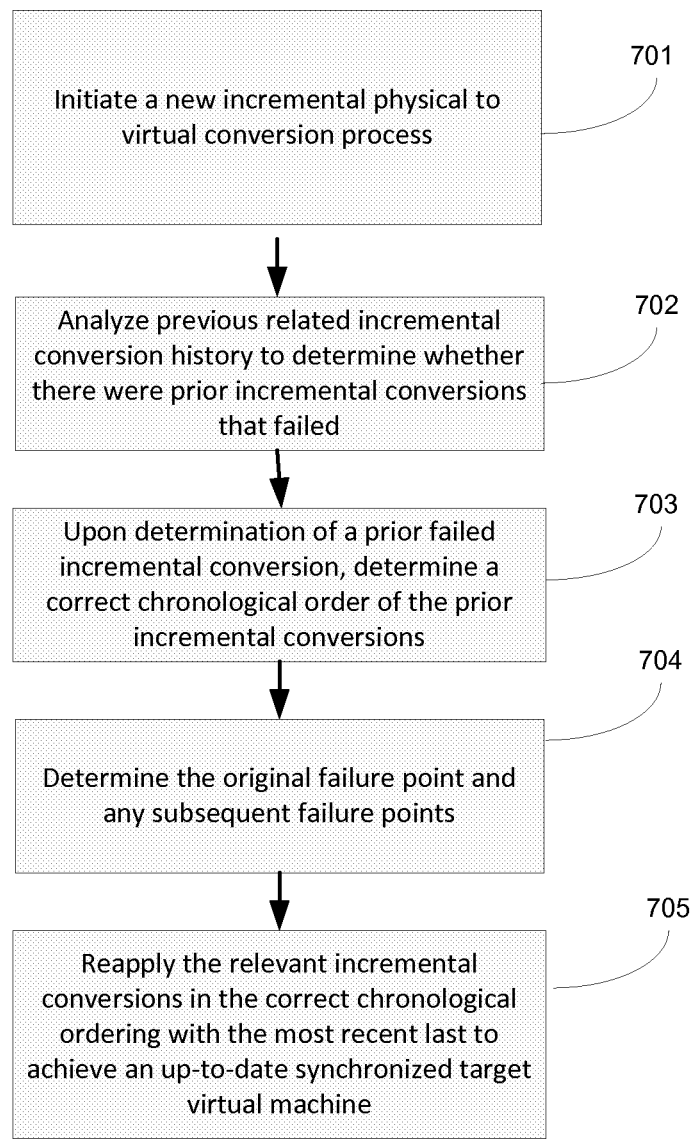
FIG. 7 shows a flowchart of the steps of an incremental self-healing physical to virtual conversion process in accordance with one embodiment of the present invention.

FIG. 7 shows a flowchart of the steps of an incremental self-healing physical to virtual conversion process 700 in accordance with one embodiment of the present invention.

Process 700 begins in step 701, where a new incremental physical to virtual conversion process is initiated.

In step 702, the previous related incremental conversion history (e.g., snapshot history, etc.) is analyzed to determine whether there were any prior incremental conversions that failed (e.g., prior snapshots that failed to update the target virtual machine).

In step 703, upon a determination that a prior incremental conversion failed (e.g., was not correctly applied to the target virtual machine), a correct chronological order of the prior incremental conversions is determined.

In step 704, the original failure point and any subsequent failure points is determined.

In step 705, the data from each of the relevant prior incremental conversions is re-applied in the correct chronological ordering, with the most recent being re-applied last.

Figure 8:
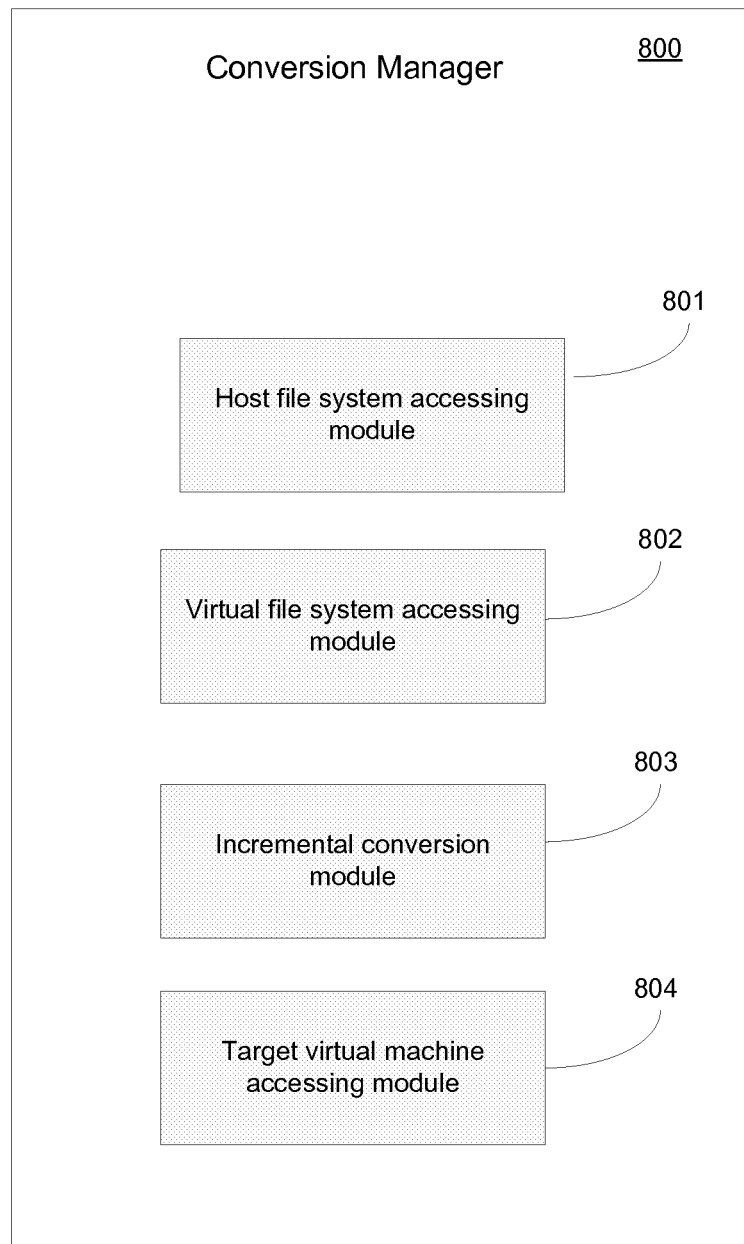
FIG. 8 shows a diagram of a conversion manager that implements certain aspects of the replication functionality in accordance with one embodiment of the present invention.

FIG. 8 shows a diagram of a conversion manager 800 that implements certain aspects of the replication functionality in accordance with one embodiment of the present invention. The conversion manager 800 is a software component or module that when instantiated, implements the functionality of the replication processes of embodiments of the present invention. The conversion manager 800 includes a host file system accessing module 801 that functions by accessing the host file system to read the physical volumes of the host file system. A virtual file system accessing module 802 is included and functions by accessing the virtual file system of a virtual machine and reading the virtual file systems. An incremental conversion module is included and functions by implementing the incremental conversion functionality (e.g., incremental physical to virtual snapshots). A target virtual machine access module is included and functions by generating accurate chronological orders of incremental conversions and by determining the original failure point and all subsequent failure points and re-applying the data from each of those in the correct chronological ordering with the most recent last.

Figure 9:
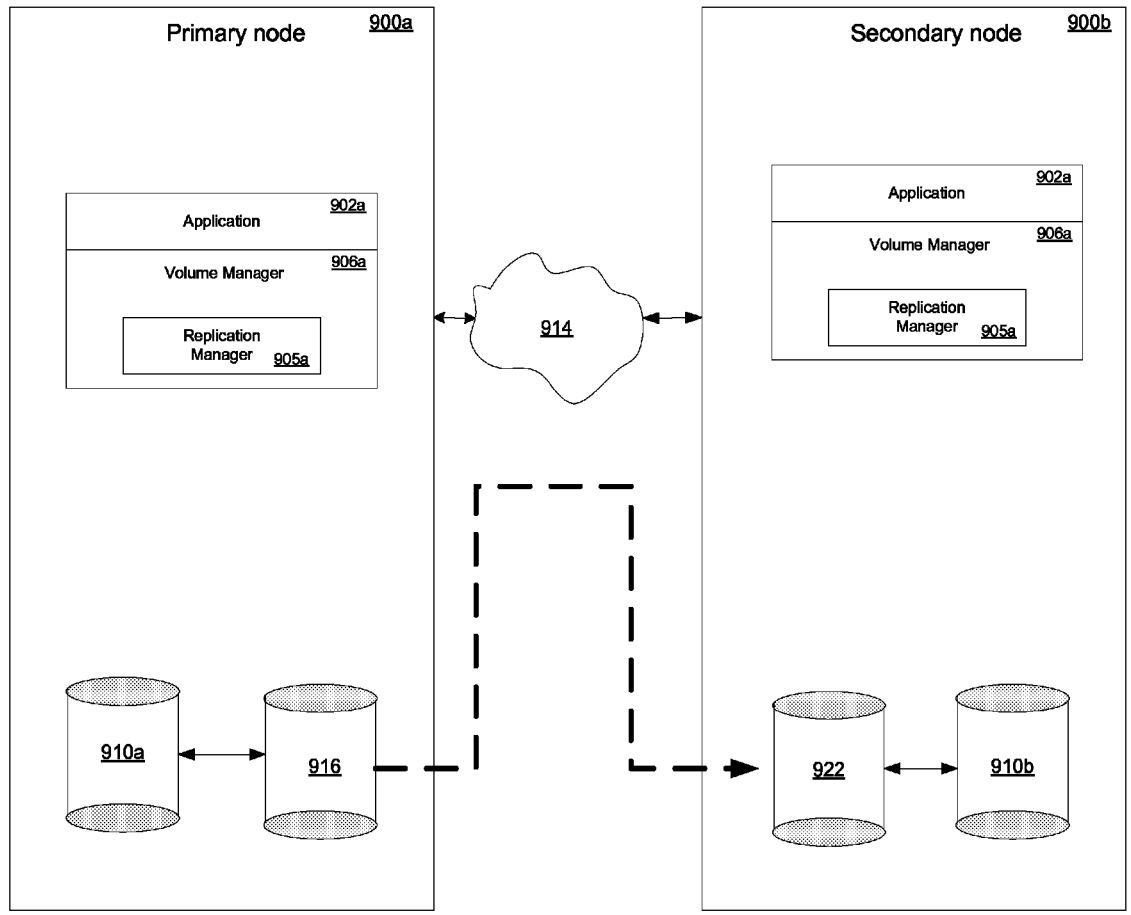
FIG. 9 illustrates an example of a snap shot replication operation within an exemplary replication system environment according to one embodiment of the present invention.

FIG. 9 illustrates an example of a snap shot replication operation within an exemplary replication system environment according to one embodiment of the present invention. To maintain the accessibility of the virtual file system on the primary volume, a point-in-time "snapshot" volume (sv) is created and the replication is performed using the snapshot volume. In the illustrated embodiment, copies of incrementally modified or changed data (e.g., of the virtual file system 301 of FIG. 3) of a primary volume (v) on which a primary file system is mounted within primary node 900a are transferred to a replicated secondary volume (vr) on which a secondary file system is mounted within a secondary node 900b as needed by the replication process. A point-in-time "snapshot" volume (sv) is created and the replication is performed using the snapshot volume in order to maintain the accessibility of the primary volume. Similarly, to maintain the accessibility of the secondary volume, a point-in-time "snapshot" volume (rsv) is created and used at the secondary node 900b to receive incremental changes from the primary node 900a and to restore the replicated secondary volume. In this manner, embodiments of the present invention keep the virtual machine and virtual file system online and accessible and fully functional throughout the replication process.

In the replication system of the illustrated embodiment, a primary node 900a is coupled to a secondary node 900b via a network 914 (e.g., an IP network, LAN, WAN, or other communication link). Primary node 900a and secondary node 900b of the illustrated embodiment each respectively includes an application 902, a volume manager 906 and a periodic replication manager 905 as shown.

It should be noted that although the volumes 910a, 910b, 916 and 922 are illustrated as residing within the enclosures of the primary node 900a and the secondary node 900b (e.g., disk drives, solid-state disks, or the like), the volumes can reside outside the enclosures and can be accessed via network and/or bus connections (e.g., Ethernet, fiber channel, etc.).

Figure 10:
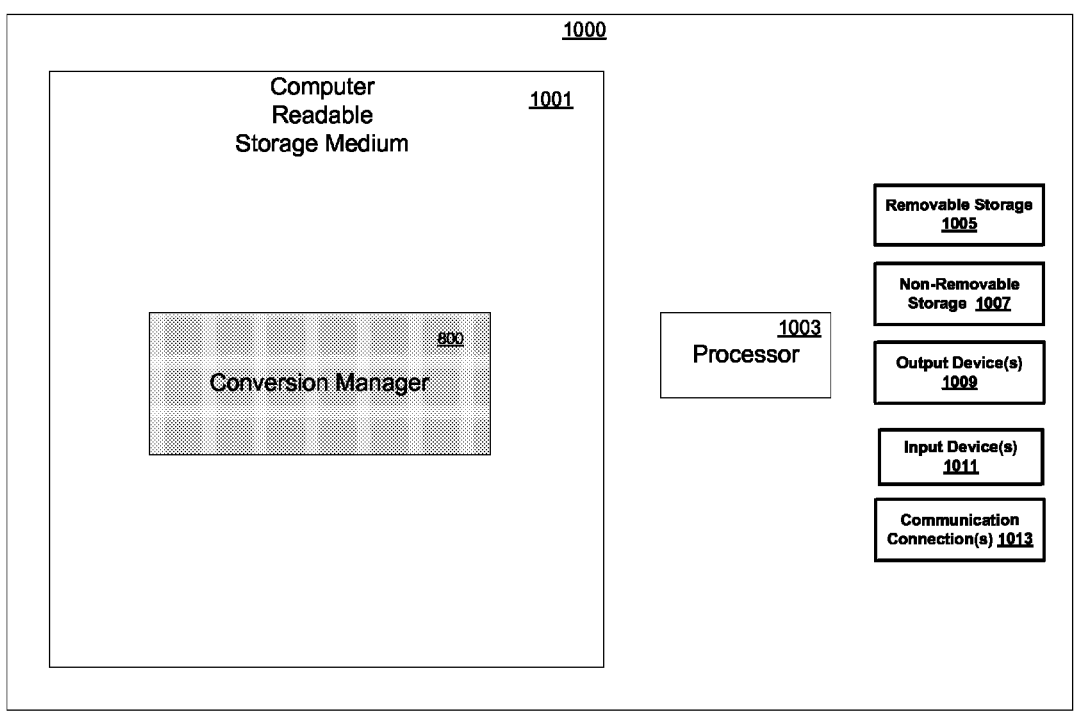
FIG. 10 depicts a block diagram of a computer system suitable for implementing certain functionality in accordance with one embodiment of the present invention.

FIG. 10 shows an exemplary computer system 1000 according to one embodiment. Computer system 1000 depicts the components of a basic computer system providing the execution environment for certain hardware-based and software-based functionality for the above described embodiments. For example, computer system 1000 can be a system upon which the replication manager 905a and one or more software stacks from FIG. 9 are instantiated. Computer system 1000 can be implemented as, for example, a server computer system, workstation computer system, desktop computer system, or laptop computer system. Similarly, computer system 1000 can be implemented as a handheld device. Computer system 1000 typically includes at least some form of computer readable media (e.g., computer readable storage medium 1001). Computer readable media can be a number of different types of available media that can be accessed by computer system 1000 and can include, but is not limited to, computer storage media.

In its most basic configuration, computer system 1000 typically includes processing unit 1003 and a computer readable storage medium 1001. Depending on the exact configuration and type of computer system 1000 that is used, memory 1001 can be volatile (e.g., such as DRAM, etc.), non-volatile (e.g., such as ROM, flash memory, etc.) or some combination of the two. Similarly, the memory 1001 can comprise other devices besides solid-state devices, such as, for example, magnetic disk-based media, optical media, or the like.

Additionally, computer system 1000 can include other mass storage systems (e.g., removable 1005 and/or non-removable 1007) such as magnetic or optical disks or tape. Similarly, computer system 1000 can include input devices 1011 and/or output devices 1009 (e.g., such as a display). Computer system 1000 can further include communication connections 1013 to other devices, computers, networks, servers, etc. using either wired or wireless media. As all of these devices are well known in the art, they need not be discussed in detail.

It should further be noted, that the computer system 1000 can have some, most, or all of its functionality supplanted by a distributed computer system having a large number of dispersed computing nodes, such as would be the case where the functionality of the computer system 1000 is partly or wholly executed using a cloud computing environment.

Figure 11:
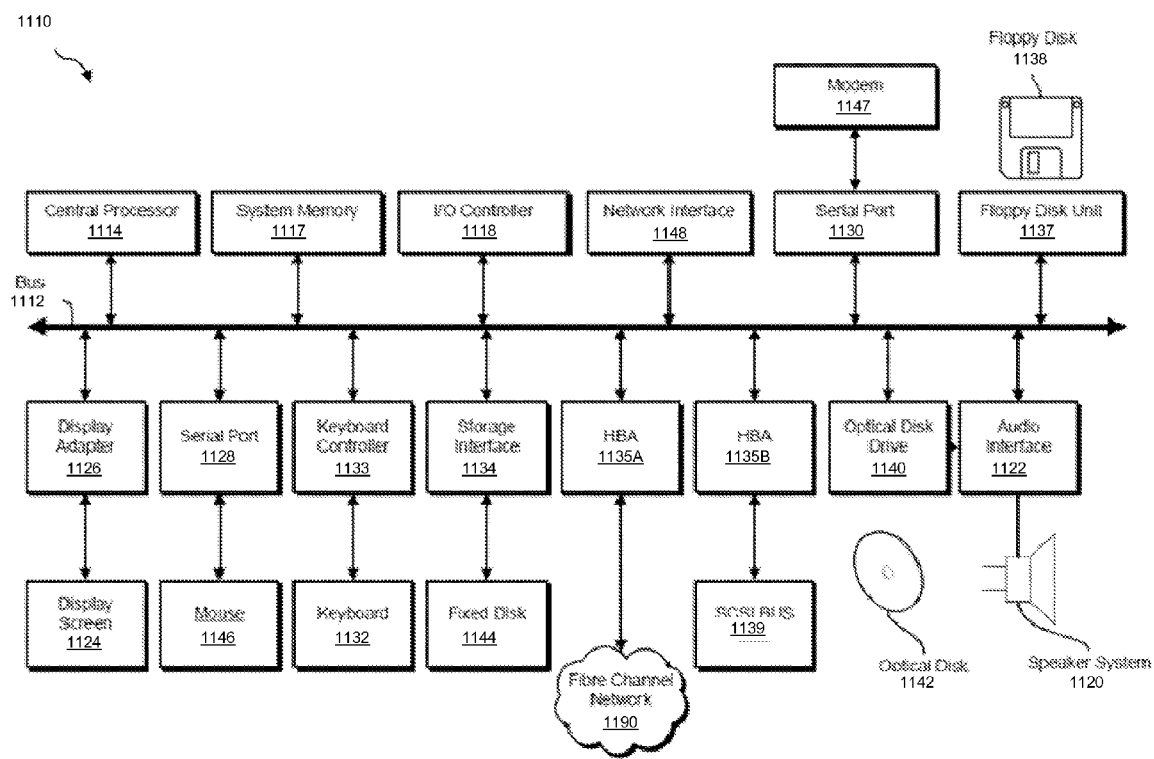
FIG. 11 depicts a block diagram of a second computer system suitable for implementing certain functionality in accordance with one embodiment of the present invention.

FIG. 11 depicts a block diagram of a second computer system 1110 suitable for implementing certain functionality in accordance with one embodiment of the present invention. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. In the FIG. 11 embodiment, the system memory 1117 instantiates a replication manager module 1150 which implements the continuous replication functionality described above. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP).

Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. The operation of a computer system such as that shown in FIG. 11 is readily known in the art and is not discussed in detail in this application. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS°, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for converting a physical file system to a virtual file system of a virtual machine, comprising:
   initiating a new incremental physical to virtual conversion process;
   analyzing a history of a plurality of prior incremental conversions to determine whether there exists at least one prior incremental conversion that failed;
   upon determination that a prior failed incremental conversion occurred, determining a correct chronological order of the plurality of prior incremental conversions;
   determining an original failure point and any subsequent failure points; and
   re-applying the prior incremental conversions from each of said original failure point and said subsequent failure points in the correct chronological order with the most recent incremental conversion re-applied last.

2. The method of claim 1, wherein the physical file system is a physical volume and the virtual file system is a virtual volume.

3. The method of claim 1, wherein the physical file system comprises a physical LUN and the virtual file system comprises a virtual LUN.

4. The method of claim 1, wherein the physical file system comprises a physical hard drive and the virtual file system comprises a virtual hard drive.

5. The method of claim 1, wherein the converting of the physical file system to the virtual file system comprises a self-healing process that is free of operator interaction.

6. The method of claim 1, wherein the virtual machine is processed by applying a set of incremental conversions in reverse chronological order to the virtual file system.

7. The method of claim 1, wherein the plurality of incremental conversions comprises a plurality of snapshots.

8. A computer readable storage medium having stored thereon, computer executable instructions that, if executed by a computer system cause the computer system to perform a method comprising:
   initiating a new incremental physical to virtual conversion process;
   analyzing a history of a plurality of prior incremental conversions to determine whether there exists at least one prior incremental conversion that failed;
   upon determination that a prior failed incremental conversion occurred, determining a correct chronological order of the plurality of prior incremental conversions;
   determining an original failure point and any subsequent failure points; and
   re-applying the prior incremental conversions from each of said original failure point and said subsequent failure points in the correct chronological order with the most recent incremental conversion re-applied last.

9. The computer readable storage medium of claim 8, wherein the physical file system is a physical volume and the virtual file system is a virtual volume.

10. The computer readable storage medium of claim 8, wherein the physical file system comprises a physical LUN and the virtual file system comprises a virtual LUN.

11. The computer readable storage medium of claim 8, wherein the physical file system comprises a physical hard drive and the virtual file system comprises a virtual hard drive.

12. The computer readable storage medium of claim 8, wherein the converting of the physical file system to the virtual file system comprises a self-healing process that is free of operator interaction.

13. The computer readable storage medium of claim 8, wherein the virtual machine is processed by applying a set of incremental conversions in reverse chronological order to the virtual file system.

14. The computer readable storage medium of claim 8, wherein the plurality of incremental conversions comprises a plurality of snapshots.

15. A volume conversion system, comprising:
   a computer system having a processor coupled to a computer readable storage media and executing computer readable code which causes the computer system to implement a conversion manager module, wherein the conversion manager module:
   initiates a new incremental physical to virtual conversion process;

analyzes a history of a plurality of prior incremental conversions to determine whether there exists at least one prior incremental conversion that failed;

upon determination that a prior failed incremental conversion occurred, determines a correct chronological order of the plurality of prior incremental conversions;

determine an original failure point and any subsequent failure points; and re-apply the prior incremental conversions from each of said original failure point and said subsequent failure points in the correct chronological order with the most recent incremental conversion re-applied last.

16. The volume conversion system of claim 15, wherein the physical file system is a physical volume and the virtual file system is a virtual volume.

17. The volume conversion system of claim 15, wherein the physical file system comprises a physical LUN and the virtual file system comprises a virtual LUN.

18. The volume conversion system of claim 15, wherein the physical file system comprises a physical hard drive and the virtual file system comprises a virtual hard drive.

19. The volume conversion system of claim 15, wherein the converting of the physical file system to the virtual file system comprises a self-healing process that is free of operator interaction.

20. The volume conversion system of claim 15, wherein the plurality of incremental conversions comprises a plurality of snapshots.

* * * * *